United States Patent
Qaderi et al.

(10) Patent No.: US 10,674,443 B2
(45) Date of Patent: Jun. 2, 2020

(54) METHOD AND SYSTEM FOR BATTERY LIFE IMPROVEMENT FOR LOW POWER DEVICES IN WIRELESS SENSOR NETWORKS

(71) Applicant: BlackBerry Limited, Waterloo (CA)

(72) Inventors: Hashim Mohammad Qaderi, Kitchener (CA); Edward Snow Willis, Ottawa (CA); Yuhui Liu, Waterloo (CA); Michael Peter Montemurro, Toronto (CA)

(73) Assignee: BlackBerry Limited, Waterloo (CA)

( * ) Notice: Subject to any disclaimer, the term of this patent is extended or adjusted under 35 U.S.C. 154(b) by 58 days.

(21) Appl. No.: 15/948,464

(22) Filed: Apr. 9, 2018

(65) Prior Publication Data
US 2019/0059053 A1    Feb. 21, 2019

Related U.S. Application Data

(63) Continuation-in-part of application No. 15/680,285, filed on Aug. 18, 2017.

(51) Int. Cl.
*H04W 52/02* (2009.01)
*H04W 72/04* (2009.01)

(52) U.S. Cl.
CPC ... *H04W 52/0216* (2013.01); *H04W 52/0219* (2013.01); *H04W 52/0235* (2013.01); *H04W 52/0248* (2013.01); *H04W 72/042* (2013.01)

(58) Field of Classification Search
CPC ......... H04W 52/0216; H04W 52/0219; H04W 72/042; H04W 52/0235; H04W 52/0248
See application file for complete search history.

(56) References Cited

U.S. PATENT DOCUMENTS

| | | | |
|---|---|---|---|
| 8,391,260 B1 | 3/2013 | Kopikare et al. | |
| 9,119,236 B1* | 8/2015 | Martin | H05B 47/19 |
| 2004/0260427 A1* | 12/2004 | Wimsatt | G05B 15/02 |
| | | | 700/275 |
| 2005/0275541 A1* | 12/2005 | Sengupta | G08B 21/0469 |
| | | | 340/573.1 |
| 2006/0020972 A1* | 1/2006 | Regan | H04H 20/426 |
| | | | 725/46 |
| 2007/0207750 A1 | 9/2007 | Brown et al. | |
| 2008/0211708 A1* | 9/2008 | Haberland | G01S 13/87 |
| | | | 342/27 |
| 2009/0040039 A1* | 2/2009 | Kaneko | H04W 40/28 |
| | | | 340/539.3 |
| 2009/0088605 A1* | 4/2009 | Ross | A61B 5/0002 |
| | | | 600/300 |

(Continued)

OTHER PUBLICATIONS

European Patent Office, Extended European Search Report for Application No. 18188937.9, dated Dec. 4, 2018.

*Primary Examiner* — Tejis Daya
(74) *Attorney, Agent, or Firm* — Moffat & Co

(57) ABSTRACT

A method at a module within a sensor system for updating a timing profile, the method including: turning on a radio of the sensor module for a first time duration; detecting signals from other modules within the sensor system; for each signal, storing data comprising a time such signal is received and an identifier for a module sending such signal; sending the data to a server; and receiving the timing profile from the server.

19 Claims, 12 Drawing Sheets

(56) References Cited

U.S. PATENT DOCUMENTS

| | | | |
|---|---|---|---|
| 2009/0099820 A1* | 4/2009 | Kaplan | H04M 1/72569 702/189 |
| 2009/0310572 A1* | 12/2009 | Wang | H04J 3/0697 370/336 |
| 2010/0008272 A1* | 1/2010 | Messinger | H04Q 9/00 370/311 |
| 2010/0165943 A1* | 7/2010 | Kato | H04W 8/26 370/329 |
| 2010/0305779 A1* | 12/2010 | Hassan | G01C 17/38 701/2 |
| 2012/0078429 A1* | 3/2012 | Weston | G06F 11/3006 700/295 |
| 2013/0012220 A1* | 1/2013 | Waris | H04W 4/38 455/450 |
| 2013/0226357 A1* | 8/2013 | Ersavas | A01G 25/167 700/284 |
| 2013/0235773 A1* | 9/2013 | Wang | H04W 52/0206 370/311 |
| 2013/0335219 A1* | 12/2013 | Malkowski | G08B 13/22 340/539.22 |
| 2014/0120962 A1* | 5/2014 | Merlin | H04W 68/02 455/466 |
| 2014/0126461 A1* | 5/2014 | Ghosh | H04W 88/04 370/315 |
| 2014/0153460 A1 | 6/2014 | Shrivastava et al. | |
| 2014/0274181 A1 | 9/2014 | Lovegren et al. | |
| 2014/0341105 A1* | 11/2014 | Vardhan | H04W 24/02 370/315 |
| 2015/0347959 A1 | 12/2015 | Skaaksrud | |
| 2016/0142974 A1 | 5/2016 | Lindoff et al. | |
| 2017/0019853 A1 | 1/2017 | Ghosh et al. | |
| 2017/0078195 A1* | 3/2017 | Raman | H04L 45/74 |
| 2017/0214620 A1* | 7/2017 | Haleem | H04W 4/70 |
| 2018/0097572 A1* | 4/2018 | Shibata | H04B 17/318 |
| 2018/0097825 A1* | 4/2018 | Pavlas | G06F 21/552 |
| 2019/0159281 A1* | 5/2019 | Amin | H04W 52/02 |
| 2019/0230615 A1* | 7/2019 | Werner | H04B 17/318 |

* cited by examiner

METHOD AND SYSTEM FOR BATTERY LIFE IMPROVEMENT FOR LOW POWER DEVICES IN WIRELESS SENSOR NETWORKS

FIELD OF THE DISCLOSURE

The present disclosure relates to power saving techniques for Internet of Things (IOT) devices, and in particular relates it to power saving during communication for IOT devices.

BACKGROUND

Many Internet of Things (IOT) devices are power limited devices that are not connected to external power sources. For example, such power limited devices tend to be powered by sources such as batteries, fuel cells or other similar options.

Often, such power limited devices need to operate for a significant amount of time without being connected to an external power source. This means that the devices need to operate with low power consumption. However, such devices also need to perform the functionality for which they are intended. For example, in a sensor network, the gateway, sensor module and sensors need to communicate information. Monitoring and controlling the sensors or sensor parameters maybe crucial and preferably should be done in real time or almost real time without loss of data in many cases.

Often wireless sensor modules, when sending data, will consume a significant amount of power. In such scenario, it may be challenging to achieve battery life targets for low-power IOT devices.

BRIEF DESCRIPTION OF THE DRAWINGS

The present disclosure will be better understood with reference to the drawings, in which.

DETAILED DESCRIPTION OF THE DRAWINGS

Figure 1:
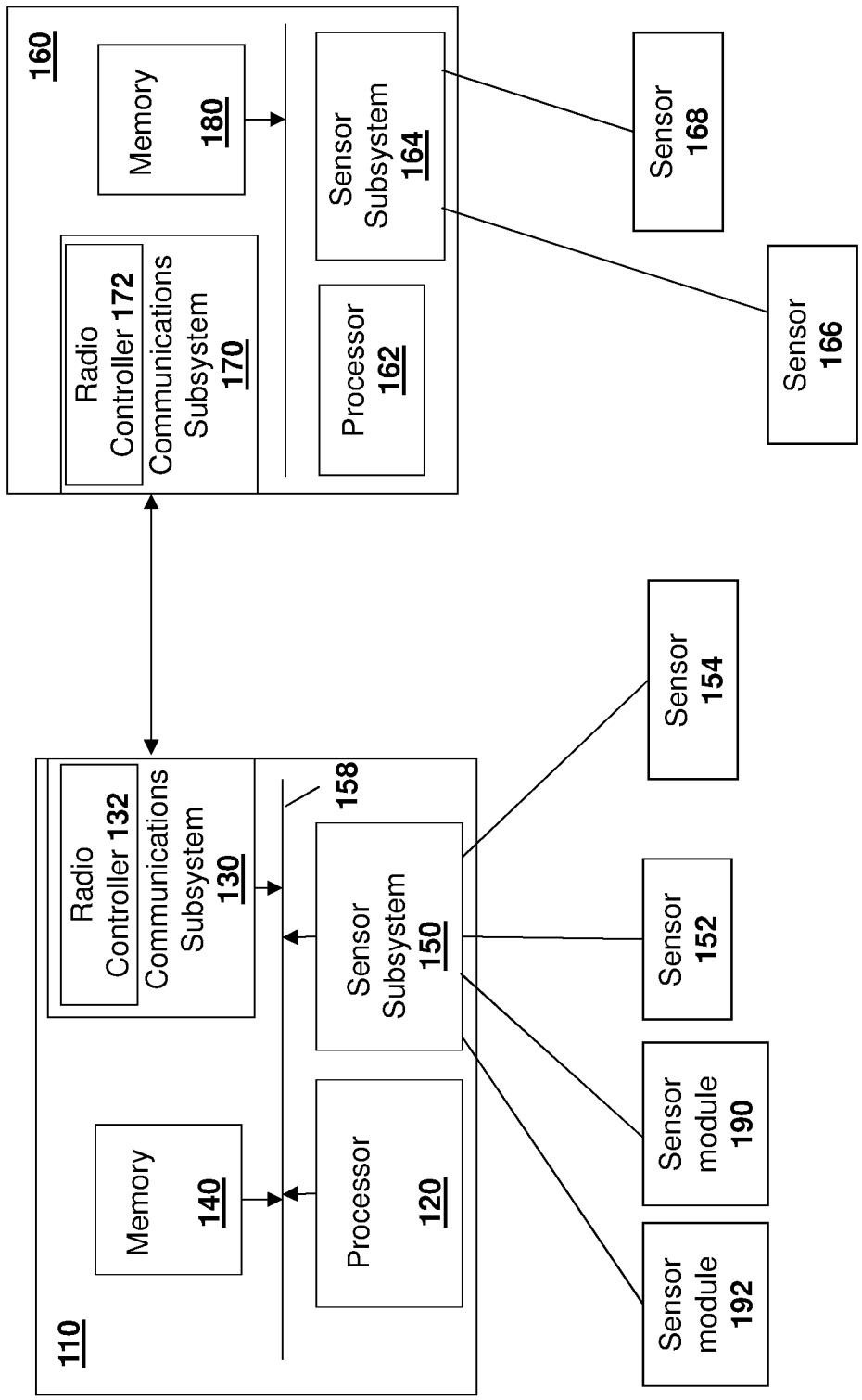
FIG. 1 is a block diagram showing an example gateway and sensor module capable of being used in accordance with the embodiments of the present disclosure.

The present disclosure provides a method at a module within a sensor system for updating a timing profile, the method comprising: turning on a radio of the sensor module for a first time duration; detecting signals from other modules within the sensor system; for each signal, storing data comprising a time such signal is received and an identifier for a module sending such signal; sending the data to a server; and receiving the timing profile from the server.

The present disclosure further provides a module within a sensor system, the module comprising: a processor; and a communications subsystem having a radio, wherein the module is configured to: turn on the radio of the module for a first time duration; detect signals from other modules within the sensor system; for each signal, store data comprising a time such signal is received and an identifier for a module sending such signal; send the data to a server; and receive a timing profile from the server.

The present disclosure further provides a non-transitory computer readable medium for storing instruction code, which, when executed by a processor of a module within a sensor system, cause the module to: turn on the radio of the module for a first time duration; detect signals from other modules within the sensor system; for each signal, store data comprising a time such signal is received and an identifier for a module sending such signal; send the data to a server; and receive a timing profile from the server.

As provided above, it may be extremely challenging to achieve a battery life target for low-power IOT devices such as a sensor module or gateway. In a sensor network, often wireless sensor modules are capable of measuring sensor parameters in low power mode. However, it may not be possible to sending of measured sensor data in a low power mode and may consume a significant amount of power. This may pose a challenge to ensure no loss of information.

In a typical system, to ensure a wireless gateway or hub does not lose data, the gateway or hub should always be powered on and should be listening to all sensor modules. However, this consumes a significant amount of power and is not practical from a battery perspective when operating a power limited wireless sensor network.

On the wireless sensor module, to save power, the sensor modules typically wake-up and send data to the wireless hub or gateway at predefined intervals or when some critical event occurs.

If a power limited wireless gateway is not designed to accept data from sensor modules whenever such sensor module transmits, the wireless sensor module may either be kept on for a longer duration or will need to send the same data in the next cycle at a predefined update. Both these options impact the battery life of a low-power battery-operated wireless sensor module.

As more sensor modules are added to a sensor network, it becomes more challenging for a gateway to gather the data while maintaining a battery life target.

In some embodiments, the wireless sensor module may be created by a third party and may not be configurable. In this case, it may be difficult to develop gateways that gather data from these third-party sensor modules while maintaining a battery life target.

In order to overcome the above, embodiments of the present disclosure allow for configuration of one or both of the wireless sensor module and the wireless gateway to operate in a low power mode and wake-up only when either the wireless sensor modules or gateways have some data to be transferred between them.

The present disclosure is described with regards to sensor systems. However, the synchronization of the modules and exchange of data could be equally used with other systems in which power limited devices need to communicate with each other. As such, the present disclosure is not limited to sensor systems.

Using the example of a sensor system, one sensor system is shown with regard to FIG. 1. The sensor system of FIG. 1 is however merely an example and other sensor systems could equally be used in accordance with the embodiments of the present disclosure.

Reference is now made to FIG. 1, which shows an example sensor system. The sensor system of FIG. 1 includes a gateway 110, which can be any computing device or network node. In some embodiments, gateway 110 may also be referred to as a hub. Such computing device or network node may include any type of electronic device, including but not limited to, mobile devices such as smartphones or cellular telephones. Examples can further include fixed or mobile devices, such as IOT devices, endpoints, home automation devices, medical equipment in hospital or home environments, inventory tracking devices, environmental monitoring devices, energy management devices, infrastructure management devices, vehicles or devices for vehicles, fixed electronic devices, among others.

Gateway 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example different radio technologies.

Communications subsystem 130 allows gateway 110 to communicate with other devices or network elements. Communications subsystem 130 may use one or more of a variety of communications types, including but not limited to cellular, satellite, Bluetooth™, Bluetooth™ Low Energy (BLE), Wi-Fi, wireless local area network (WLAN), wireless personal area networks (WPAN), near field communications (NFC), ZigBee or any other IEEE 802.15 low power technology, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

One or more of the radios within communications subsystem 130 may include a radio controller 132. Such radio controller can operate to determine if a radio within communications subsystem 130 is receiving signals that need to be processed in one embodiment. For example, the radio controller 132 can detect if BLE communications from another component of the sensor system are trying to communicate with the gateway 110.

Processor 120 generally controls the overall operation of the gateway 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, gateway 110 may access data or programmable logic from an external storage medium, for example through communications subsystem 130.

In the embodiment of FIG. 1, gateway 110 may utilize a plurality of sensors, which may either be part of gateway 110 in some embodiments or may communicate with gateway 110 in other embodiments. For internal sensors, processor 120 may receive input from a sensor subsystem 150.

For external sensors, sensors 152 and 154 are shown in the embodiment of FIG. 1.

Examples of sensors include, but are not limited to, a positioning sensor, a vibration sensor, a temperature sensor, a pressure sensor, a tire monitoring sensor, one or more image sensors, accelerometer, light sensors, gyroscopic sensors, or other sensors. Other sensors may be any sensor that is capable of reading or obtaining data that may be useful for gateway 110. However, such list of sensors is merely provided as an example, and in other embodiments different sensors or a subset of sensors may be used.

In other embodiments, gateway 110 may not have any sensors, either internal or external, associated directly to it. For example, in some embodiments, gateway 110 may instead communicate with sensor modules, as described below.

Communications between the various elements of gateway 110 may be through an internal bus 158 in one embodiment. However, other forms of communication are possible.

A sensor system may further include one or more sensor modules. A sensor module is a system that allows communication from various sensors, where data can be received, stored, compiled, and/or processed prior to being passed to another element in the system, such as gateway 110.

For example, in the embodiment of FIG. 1, a sensor module 160 is shown. Sensor module 160 comprises a processor 162 and at least one communications subsystem 170, where the processor 162 and communications subsystem 172 cooperate to perform the methods of the embodiments described herein. Communications subsystem 170 may, in some embodiments, comprise multiple subsystems, for example different radio technologies.

Communications subsystem 170 allows sensor module 160 to communicate with other devices or network elements. Communications subsystem 170 may use one or more of a variety of communications types, but would typically use short range communication such as, but not limited to Bluetooth™, BLE, Wi-Fi, WLAN, WPAN, NFC, ZigBee or other IEEE 802.15 low power technology, or wired connections such as Ethernet or fiber, among other options.

As with communications subsystem 130, a communications subsystem 170 will typically have one or more receivers and transmitters, as well as associated components such as one or more antenna elements, local oscillators (LOs), and may include a processing module such as a digital signal processor (DSP). Again, the particular design of the communication subsystem 170 will be dependent upon the communication network or communication technology on which the sensor module is intended to operate.

One or more of the radios within communications subsystem 170 may include a radio controller 172. Such a radio controller can operate to determine if a radio within the communications subsystem 170 is receiving signals that need to be processed in one embodiment. For example, radio controller 172 can detect if BLE communications from another component of the sensor system is being used to try to communicate with the sensor module 160.

Processor 162 generally controls the overall operation of the sensor module 160 and is configured to execute programmable logic, which may be stored, along with data, using memory 180. Memory 180 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 180, sensor module 160 may access data or programmable logic from an external storage medium, for example through communications subsystem 170.

In the embodiment of FIG. 1, sensor module 160 may utilize a plurality of sensors, which may either be part of sensor module 160 in some embodiments or may communicate with sensor module 160 in other embodiments. For internal sensors, processor 162 may receive input from a sensor subsystem 164.

For external sensors, sensors 166 and 168 are shown in the embodiment of FIG. 1.

Gateway 110 may communicate with zero, one, or a plurality of sensor modules. In the example of FIG. 1, in addition to sensor module 160, gateway 110 communicates with sensor modules 190 and 192.

In a sensor system, typically the gateway 110 will communicate with external network resources, while sensor module 160 will typically communicate internally, for example with the gateway 110, other sensor modules, or sensors.

The sensor system, including gateway 110, may be affixed to any fixed or portable platform. For example, gateway 110 may be affixed to shipping containers, truck trailers, truck cabs in one embodiment. In other embodiments, gateway 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), pedestrians and bicycles and other types of vehicles including any combinations of any of the foregoing, whether currently existing or after arising, among others.

In other cases, gateway 110 could be carried by a user.

In other cases, gateway 110 may be affixed to stationary objects including buildings, lamp posts, fences, cranes, temporary fixtures such as emergency shelters and tents, among other options.

Such sensor system, and specifically gateway 110, sensor modules 160, 190 or 192, or sensors 152, 154, 166 or 168 may be a power limited devices. For example, gateway 110 could be a battery operated device that can be affixed to a shipping container or trailer in some embodiments. Other limited power sources could include any limited power supply, such as a small generator or dynamo, a fuel cell, solar power, among other options.

In other embodiments, components of the sensor system including gateway 110 may utilize external power, for example from the engine of a tractor pulling the trailer, from a land power source for example on a plugged in recreational vehicle or from a building power supply, among other options.

External power may further allow for recharging of batteries to allow the sensor system components such as gateway 110 to then operate in a power limited mode again. Recharging methods may also include other power sources, such as, but not limited to, solar, electromagnetic, acoustic or vibration charging.

The sensor system from FIG. 1 may be used in a variety of environments. One example environment in which the sensor system may be used is shown with regard to FIG. 2.

Figure 2:
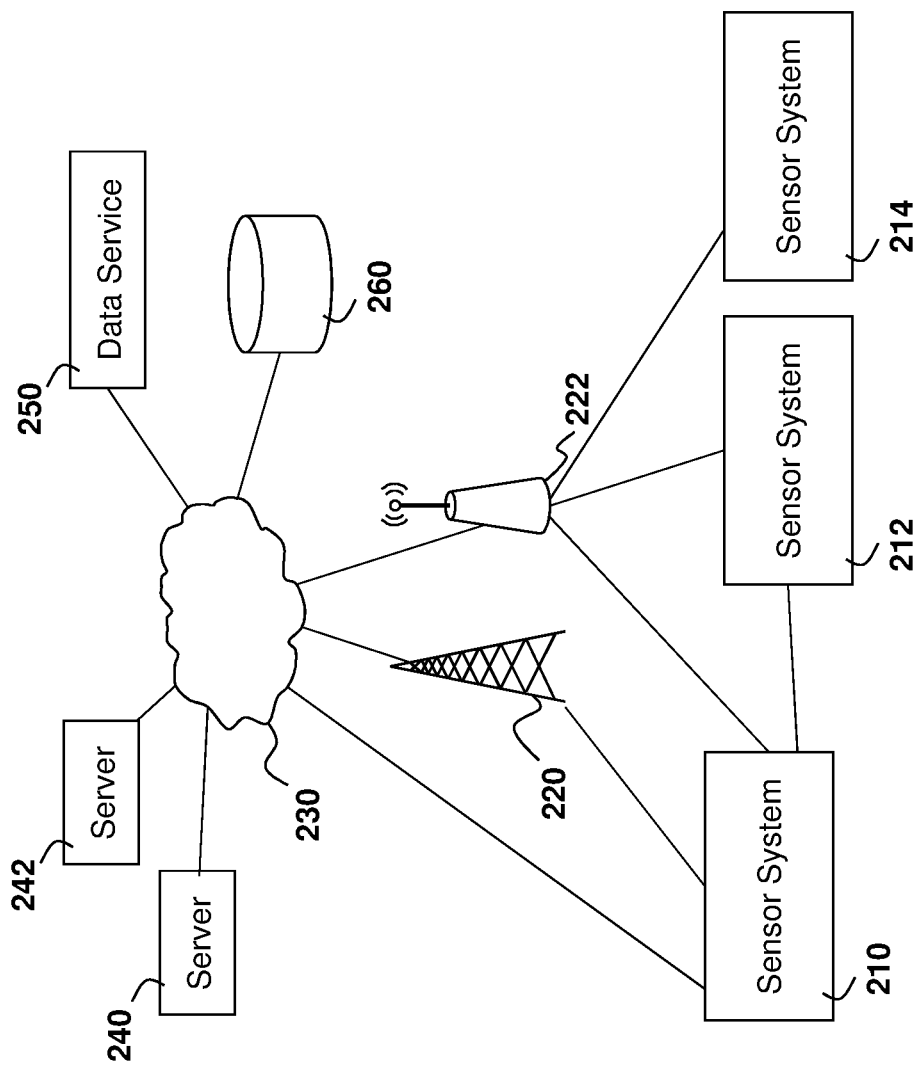
FIG. 2 is a block diagram showing an example environment for a gateway and sensor apparatus in accordance with the embodiments of the present disclosure.

Referring to FIG. 2, three sensor systems, namely sensor system 210, sensor system 212, and sensor system 214 are provided.

In the example of FIG. 2, sensor system 210 may communicate through a cellular base station 220 or through an access point 222. Access point 222 may be any wireless communication access point.

Further, in some embodiments, sensor system 210 could communicate through a wired access point such as Ethernet or fiber, among other options.

The communication may then proceed over a wide area network such as Internet 230 and proceed to servers 240 and/or 242.

Similarly, sensor system 212 and sensor system 214 may communicate with server 240 or server 242 through one or both of the base station 220 or access point 222, among other options for such communication.

In other embodiments, any one of sensor systems 210, 212 or 214 may communicate through satellite communication technology. This, for example, may be useful if the sensor system is travelling to areas that are outside of cellular coverage or access point coverage.

In other embodiments, sensor system 212 may be out of range of access point 222, and may communicate with sensor system 210 to allow sensor system 210 to act as a relay for communications.

Communication between sensor system 210 and server 240 may be one directional or bidirectional. Thus, in one embodiment sensor system 210 may provide information to server 240 but server 240 does not respond. In other cases, server 240 may issue commands to sensor system 210 but data may be stored internally on sensor system 210 until the sensor system arrives at a particular location. In other cases, two-way communication may exist between sensor system 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of sensor systems 210, 212, 214, etc. For example, the server may be located essentially anywhere so long as it has network access to communicate with sensor systems 210, 212, 214, etc.

Server 240 may, for example, be a fleet management centralized monitoring station. In this case, server 240 may receive information from sensor systems associated with various trailers or cargo containers, providing information such as the location of such cargo containers, the temperature within such cargo containers, any unusual events including sudden decelerations, temperature warnings when the temperature is either too high or too low, among other data. The server 240 may compile such information and store it for future reference. It may further alert an operator. For example, a sudden deceleration event may indicate that a trailer may have been in an accident and the operator may need to call emergency services and potentially dispatch another tractor to the location.

In other embodiments, server 240 may be a trailer tracking and maintenance server which is used to determine how far a trailer has traveled and whether any parts of the trailer need to be maintained.

In other embodiments, server 240 may be used to administer or control a sensor system 210, 212, and/or 214.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions.

Data repository or database 260 may for example provide information such as image data associated with a particular location, aerial maps, detailed street maps, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of sensor systems 210, 212, or 214 for processing at those sensor systems.

Utilizing a sensor system such as that described above, in accordance with one embodiment of the present disclosure, synchronization of communication between the gateway and sensor module or sensors is performed to reduce power consumption.

Figure 3:
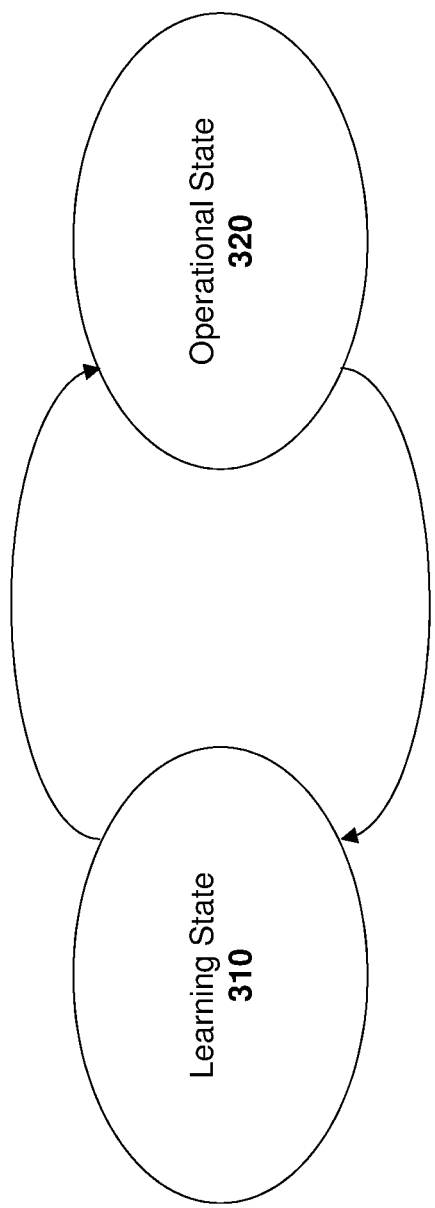
FIG. 3 is a state diagram showing transitioning between a learning state and an operational state.

The coordination of communication between a sensor module and the gateway may occur in several ways. In accordance with one embodiment of the present disclosure, the gateway and the sensor modules operate in one of two states. Reference is now made to FIG. 3.

In the embodiment of FIG. 3, one or both of the gateway or sensor module can start in a learning state 310 and then proceed to an operational state 320 when learning has been completed. The learning state 310 allows the gateway and/or sensor modules to learn the communication intervals of the other of the gateway and/or sensor modules. The learning state may further allow the gateway and sensor modules to learn communication intervals of other sensors connected to such gateway or sensor module. Such communication intervals form a timing profile for communications with the gateway, sensor modules and/or sensors. The operational state 320 is the low power operation of the gateway or sensor modules when learning has been completed.

In one embodiment, the learning state 310 can be entered automatically when the sensor system is installed on a vehicle.

In other embodiments, the learning state 310 may also be entered based on predetermined criteria or based on user input. For example, if a wireless gateway detects a new sensor or sensor module after an initial learning phase has been completed, the wireless gateway may re-enter the learning state 310 in order to determine the configuration/timing profile of the new sensor or sensor module.

In other cases, the entering of the learning state 310 may occur based on an input. Such input may be received through wired or wireless techniques including a reset button on the gateway or sensor module, a communication from the operator of the vehicle, a communication from a network operator at a central monitoring station, among other options.

In some cases, learning state 310 could be a passive learning state. In this regard, the gateway could keep the radio on for the entire learning state and listen for transmissions from the sensors or sensor modules. The gateway, by leaving its radio on for a time duration could learn the behavior/timing profiles of the sensors or sensor modules during such time duration.

Similarly, the sensor module could have its radio remain on for the entire learning state and listen for transmissions from the gateway or from sensors. The sensor module could then know when the gateway and sensors are expected to transmit.

Further, in some embodiments, the sensors themselves could also transition into a learning state in which dummy data is transmitted at the regular interval of the sensor to enable learning.

During the learning state 310, transmissions from the gateway may include a timestamp or clock value from the gateway. The gateway may, in some embodiments, be considered as the "master clock" and therefore the sensor modules could synchronize their clocks to the gateway clock.

In other embodiments, the master clock could be set based on other criteria, such as a Global Navigation Satellite System (GNSS) or other location determination system. Such signals for a location determination system typically include a timestamp, which could be used by one or both of the gateway or sensor module to synchronize their clocks.

In other embodiments, the master clock could be set based on communications with a server 240 and in particular a clock on server 240.

Rather than implicit learning, in some embodiments the learning state 310 could utilize an explicit exchange of messaging between the gateway and the sensor module for configuration. Thus, for example, when a sensor module is paired to a gateway, the gateway may send a schedule element that contains multiple wake-up schedules/timing profiles depending on the state of the gateway. Here, the state of the gateway may indicate whether the gateway is in motion or stationary, for example. The gateway may therefore send a schedule based on its stationary behavior, its in-motion behavior, and its behavior with regards to critical alarm states.

An example schedule for each of the various states of the gateway may include a known time offset or reference timestamp, a type of message, including for example alarm or normal, a wake-up duration, a communication mode such as transmit and receive or receive only, and a duty cycle between wake-up times. The message may contain less information or more information in some embodiments.

During this explicit learning phase, the "normal" wake-up of the gateway would allow the gateway to send the schedule type to the sensor module. The sensor module would use this information for the next wake-up. The sensor module could then use the wake-up period to send sensor data.

During a "alarm" wake-up, the gateway would wake-up and listen for alarms. By using a wake-up schedule, the alarm could be detected earlier by reducing potential latency caused by longer wake-up schedules for the sensor data.

Therefore, either the explicit or implicit learning state 310 allows for the synchronization of communications between with the wireless sensor module and gateway. Information may thereafter be shared between the sensor module and gateway using profiles that include update intervals, wake-up durations, among other data. Such update intervals and wake-up duration may further vary based on a motion mode, as described below.

As used herein, a timing profile is a configured schedule of wake-up period and a duration of how long the radio receiver will remain on for each wake-up.

In some embodiments, the timing profile could be a fixed profile. In this case, the profile may be set during manufacturing time.

In other cases, the timing profile may be learned only once during learning state 310.

In still other embodiments, the timing profile could be learned and updated dynamically. For example, if either the sensor module or the gateway detect that the communication timing profile has changed for whatever reason, the gateway or sensor module may re-enter the learning state 310 to learn the profile again.

In still other embodiments, the timing profile could be optimized by a server based on input from the gateway, and could then be provided back to the gateway.

Figure 4:
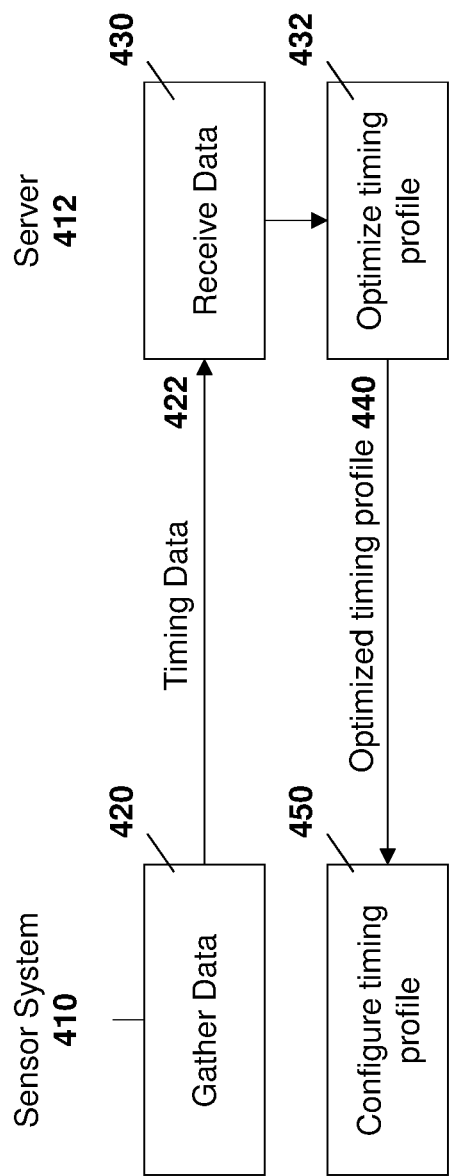
FIG. 4 is a process diagram showing a process between a sensor system and a server for optimizing a timing profile at the sensor system.

Specifically, reference is now made to FIG. 4. A sensor system 410 may be a sensor system such as that described above with regards to FIG. 2 and, in particular, may be any of sensor system 210, 212, or 214.

In the embodiment of FIG. 4, a sensor system 410 may gather data, as shown by block 420. In particular, the gateway and/or sensor module can synchronize its timing to wake up at exactly the same time as other satellite devices such as a gateway, sensor module or sensors that are about to report their statuses. To do this, the gateway and/or sensor module stays active for a configurable amount of time in order to receive messages from all of devices, as described above. For every device that reports to the sensor module or gateway, the device identifier and time that the message was received can be recorded.

Once such data has been gathered for messages received from satellite devices for a particular time period, in the embodiment of FIG. 4 the timing data may be sent to a server 412, as shown by message 422. Server 412 may, for example, be the same as server 240 from FIG. 2 above.

As shown in FIG. 4, server 412 receives the timing data at block 430 and the process then proceeds to block 432 in order to optimize as the timing profile for the sensor system 410. In particular, the server 412 may attempt to align the wake-up of all devices close to each other so that messages are not lost and wake-up times are reduced.

Server 412 may optimize the timing of the gateway, sensor modules and sensors based on the reported timing data, where such optimization includes configuring timing profiles for one or more of the gateway or sensor module and further configuring reporting on the sensors or sensor modules that can be configured.

Specifically, the server 412 may determine devices whose timing profile can be changed based on the ability of such sensor module or sensor to receive data. The server 412 can provide instructions to tell such sensor module or sensor to report at a different time.

For timing profiles that cannot be changed, these can be accommodated by the optimized timing profile for the gateway and/or sensor module.

From block 432, the server 412 may then send the optimized timing profile back to the sensor system, as shown by message 440. Such optimized timing profile 440 may include instructions for wake up and sleep cycles for the gateway and/or sensor modules. It may further include reconfiguration of reporting times for satellite devices that are reconfigurable.

The sensor system 410 may then configure its timing profile, as shown by block 450, based on the information received at message 440.

Referring again to FIG. 3, the learning state 310 may be complete after explicit messaging has been exchanged between the sensor module and gateway, or after a particular threshold condition has been met at both the gateway and sensor module. For example, the threshold condition may include the predicted profile behaving as expected for a predetermined time duration, after which the gateway and/or sensor module can assume that such profile will continue indefinitely while the vehicle is in its current state. In other embodiments, the threshold condition could be a minimum time duration. Other examples are possible.

Therefore, after making a determination that the timing profile has been learned, the gateway and/or sensor module can transition from the learning state 310 to the operational state 320. Operational state 320 allows for operation while conserving power resources.

Further, in some embodiments, the vehicle or platform for the sensor system may operate in different modes. In this case, the learning state may occur for each of different modes of operation. For example, in some cases the behavior of the gateway may differ based on a motion mode, that is whether a vehicle is stationary or moving.

Figure 5:
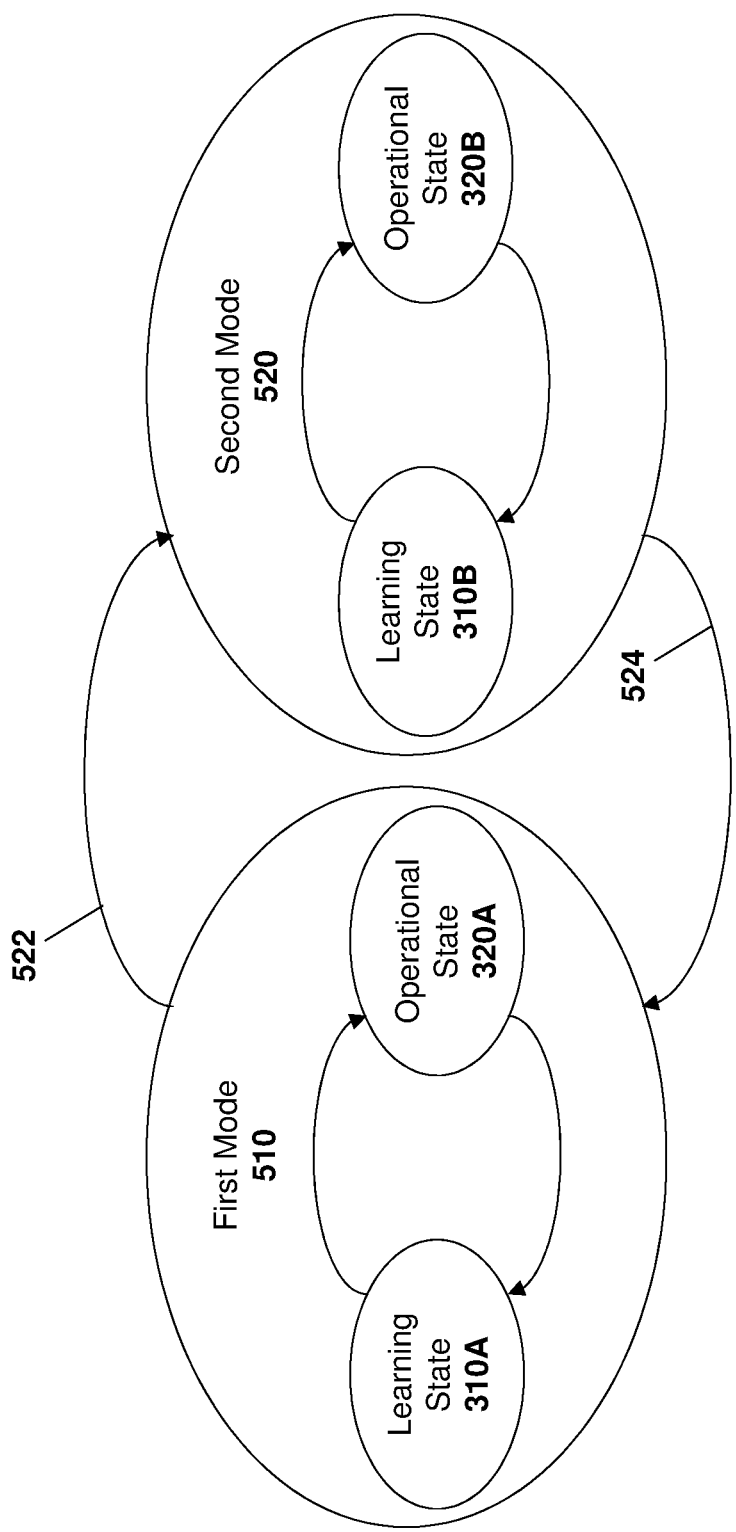
FIG. 5 is a state diagram showing a sensor system operating in a first or second mode, where each mode has a learning and operational state.

Referring to FIG. 5, the sensor system may operate in different modes. In the example of FIG. 5, the sensor system that may operate in a first mode 510 or a second mode 520, and may transition between the two modes, as shown for example by arrows 522 and 524. However, this is a simplified diagram and in other embodiments, more than two modes may exist for the sensor system.

For example, in the first mode 510 the sensor system may be moving. In the second mode 520 the sensor system may be stationary. In each mode, various sensor modules or gateways may have different operating parameters. For example, a tire pressure monitoring system (TPMS) may wish to make more frequent reports while a vehicle is in motion than while the vehicle is stationary.

Based on the different timing profiles in each mode, a different learning state and operational state may exist in each mode. As shown in FIG. 5, first mode 510 includes a learning state 510A and operational state 520A. Thus, when first entering the first mode, or on sensor changes, for example, the sensor system may enter learning state 510A to learn the timing profile for the gateway and/or sensor modules.

Similarly, in a second mode 520, a learning state 510B may be entered when the system is installed or on sensor changes, for example. In state 510B, the sensor system could learn the timing profiles for the gateway and/or sensor modules. Once learned, the system may transition to the operational state 520B while operating in the second mode 520.

While the embodiment of FIG. 5 shows only two modes, in other cases, the state transitions may be less granular. For example, the timing profile may change based on factors such as the speed of the vehicle. Thus, if the vehicle is stationary then a first timing profile for a first mode may be used. If the vehicle is moving at a first speed that falls below a threshold value, then the vehicle may utilize a second timing profile in a second mode. If the vehicle is moving at a third speed that it is above the threshold value, then the sensor system may operate using a third timing profile in a third mode.

In other embodiments, modes may be dependent on factors other than speed. For example, modes may be dependent on whether a trailer is loaded or unloaded in some cases. In other cases, a type of cargo in a trailer may create different modes. Other options are possible.

A timing profile may be determined based on various factors. For example, in cases where sensor modules wake-up only on critical events and sleep during the rest of the period, sampling at a first frequency may be reasonable. A non-limiting example may include taking a sample at a sample cycle of one minute, which may be sufficient for the operation of the system. The frequency of sampling would depend on the type of sensor and a use case. Further, time periods can be tuned based on the application.

Figure 6:
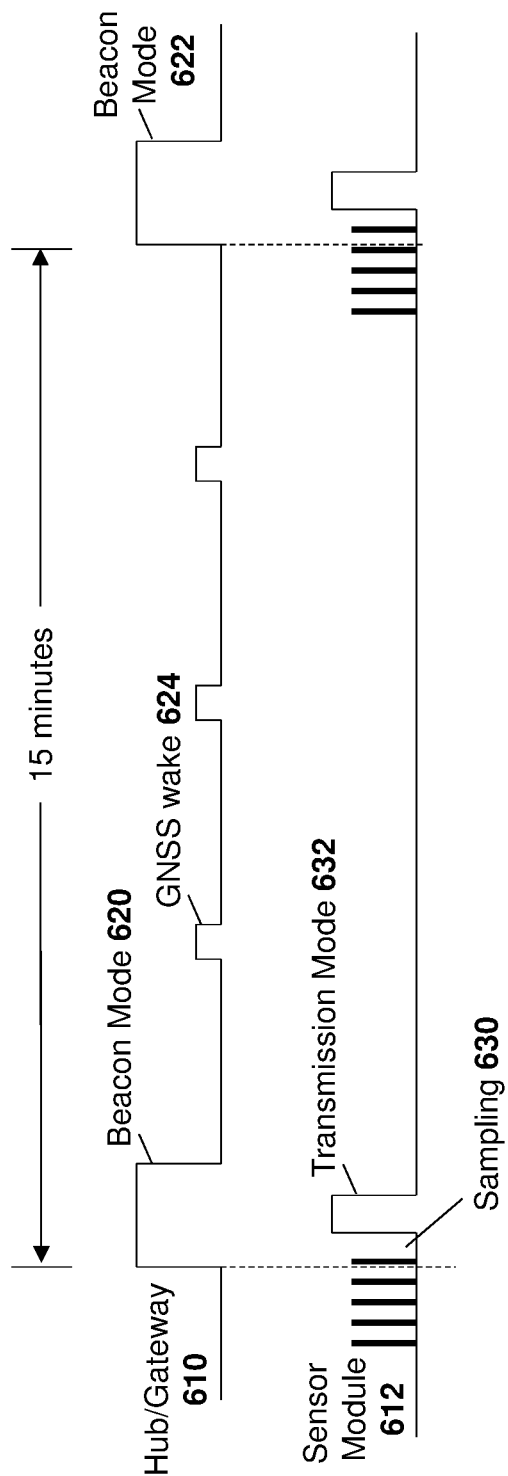
FIG. 6 is a timing diagram showing a first embodiment in which a sensor module oversamples a beacon signal from a gateway.

Once learned, timing profiles can be used based on the mode the sensor system is operating in. Reference is now made to FIG. 6, which shows an example timing diagram showing one use case in which a vehicle is in motion, and in which a gateway wakes up every 15 minutes to transmit a beacon to receive communication from sensor modules. In particular, a gateway 610 and a sensor module 612 each have a wake-up profile.

Thus, in the example of FIG. 6, gateway 610 enters a beacon mode 620 at a first time and a beacon mode 622 at a second, subsequent time. The gateway 610 may further turn on its radio for other purposes between these beacon modes, such as for a GNSS fix, shown as GNSS wake 624 in the embodiment of FIG. 6. Between these events, the radio for gateway 610 is off.

After learning the beacon modes during a learning state, for example learning state 310A from FIG. 5, a sensor module 612 may wake-up its radio just prior to the periodic wake-up of the gateway module. This is shown, for example, by sampling arrows 630. Arrows 630 indicate a periodic wake-up and sampling of the signal from the wireless gateway 610.

In accordance with the various embodiments of the present disclosure, one implementation relies on the received signal strength indicator (RSSI) and/or preamble detector in a low power mode to determine whether communication is being sent to a radio. Such RSSI and/or preamble detection may be made within a radio core, such as radio controller 132 or radio controller 172 from FIG. 1.

Therefore, the sampling shown by arrow 630 does not require the processor of the sensor module to be woken until a signal is detected, thereby saving power resources. Specifically, using sampling, the gateway and/or sensor module can operate in a low power mode without waking a power-hungry processor until a signal is detected that is directed to the gateway and/or sensor module.

In various embodiments, the receive power level may be tuned or calibrated to ensure proper RSSI detection. Further, in some embodiments the transmit power and antenna gain may be dynamically adjusted to optimize or filter the detection of the signal from sensor module or the gateway.

Sampling may be done periodically. For example, the sampling may wake-up the receiver core of the sensor module for a period of 200 ms every second until a signal is received. However, this example is non-limiting, and in other cases the sampling may occur for different durations and at different frequencies.

Thus, in accordance with the embodiment of FIG. 6, sampling (oversampling) may start a predetermined time prior to the expected beacon signal being sent from the gateway 610. Once sampling starts, as shown by arrows 630, the signal is sampled until the beacon signal is received, or until a timeout has occurred. In this case, the beacon signal would typically last longer than the off period during the sampling interval, and thus in the example of FIG. 6 the beacon signal would typically last longer than 800 ms.

However, in some embodiments, rather than oversampling, the radio may be on for a time duration.

The signal, also referred to as a preamble, from gateway 610 may consist of various information. For example, the beacon signal may provide both an asset identifier to identify the gateway, as well a sensor identifier to identify the target of the signal. The beacon signal may further provide information about the clock of the gateway 610 in some embodiments.

The gateway may then keep transmitting the preamble until either it hears back from the sensor module or until the beacon mode 620 ends.

In accordance with the embodiment of FIG. 6, sensor module 612 may queue all sensor events that it has received and may store such sensor events. For example, such sensor events may be stored in memory 180 from the embodiment of FIG. 1.

Once the beacon signal or preamble is received, the sensor module may then enter into a transmission mode 632 in which the receipt of the preamble is acknowledged and the stored sensor events are forwarded to the gateway 610. Such behavior may be referred to as a store-and-forward architecture.

Therefore, in accordance with the embodiment of FIG. 6, the sensor module wakes up in a low power mode without powering on its processor until the radio core sampling mode has detected the preamble from the gateway. At this point, the sensor module may wake-up its processor and perform the forwarding of the sensor data to the gateway.

Figure 7:
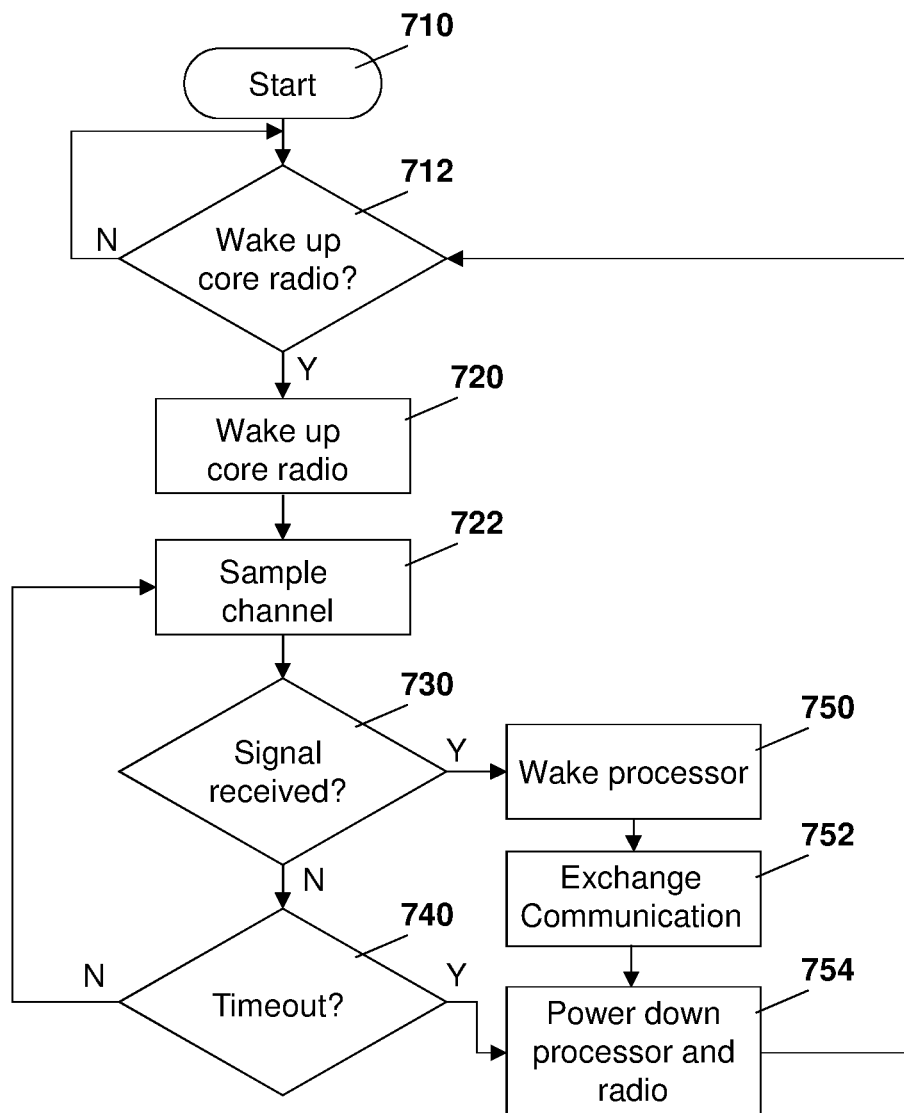
FIG. 7 is a process diagram showing a process at a sensor module for communicating with a gateway in a first mode of operation.

The gateway 610 may receive communications from a plurality of sensor modules 612. In one embodiment, gateway 610 may store data received from the sensor modules in a memory at the gateway. For example, the memory may be a memory associated with the processor or may be a flash memory at the radio subsystem, among other options. The collected data may then be forwarded to a server or cloud service. Such behavior may be referred to as a store-and-forward architecture References is now made to FIG. 7, which shows the process at the sensor module while a vehicle is in motion. The process of FIG. 7 starts at block 710 and proceeds to block 712 in which a check is made to determine whether it is time to wake-up the radio core based on the timing profile for the gateway. As will be appreciated, such a check may be a low power clock which may wake-up the radio core at set times.

If, in block 712, it is not time to wake-up the radio core, the process proceeds back to block 712 and continues to loop until the time has been reached to wake-up the radio core.

The process proceeds from block 712 to block 720 in which the radio core is awakened.

The process then proceeds to block 722 in which the radio core oversamples the communication channel. In particular, as described above, the oversampling may occur at specific frequency where the radio is turned on for a short period during such sample cycle. For example, the sample cycle may be for two seconds and the sampling may occur for 200 ms in some embodiments. However, this is only one example, and the frequency and on duration may be configurable or may be factory set to different values. Alternatively, the radio core could be turned on and could be kept on for a time duration in one embodiment.

From block 722, the process proceeds to block 730 in which a check is made to determine if a signal has been received. In particular, a check is made to determine whether the beacon preamble has been received from the gateway.

If, at block 730, it is determined that the preamble has not been received, the process proceeds to block 740 to determine whether a timeout has occurred.

From block 740, if a timeout has not occurred, the process proceeds back to block 722 in which the oversampling continues.

Conversely, if the preamble has been received, the process proceeds from block 730 to block 750 in which the processor of the sensor module is woken.

From block 750, communication may be exchanged between the gateway and sensor module at block 752. For example, such communication may include the stored sensor data from the sensor module. It may further include clock information from the gateway.

From block 752, once the communication exchange is finished, the processor and radio of the sensor module may be powered down at block 754. As used herein, when a sensor module is "powered down", this could mean that the sensor module uses little or no power. For example, the sensor module could have all functionality turned completely off, with the exception of a clock to trigger wake-up. Alternatively, powering down could mean entering a low power mode.

Also, if no preamble is received and a timeout is detected at block 740, the process can proceed to block 752 in which the radio is powered down.

From block 754 the process may then resume by proceeding back to block 712.

Figure 8:
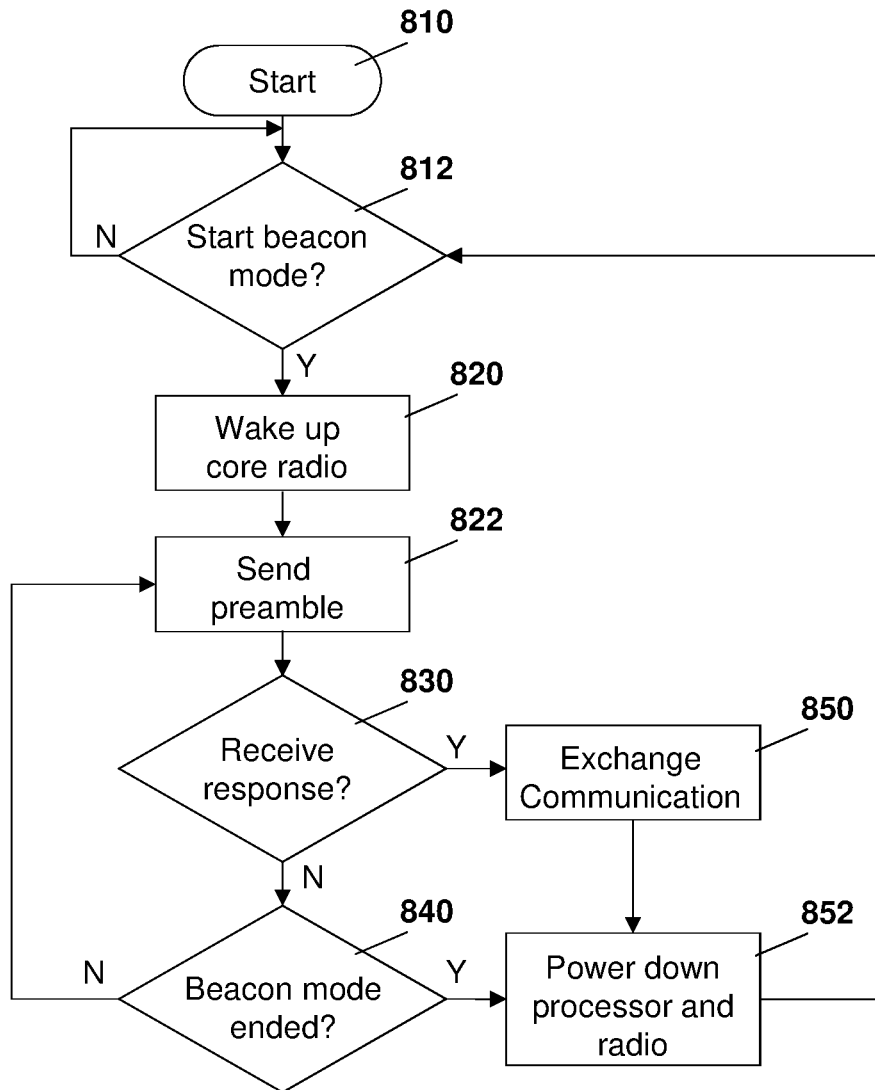
FIG. 8 is a process diagram showing a process at a gateway for communicating with a sensor module in a first mode of operation.

Reference is now made to FIG. 8, which shows a process for the operational state of a moving vehicle from the gateway perspective. As described above, the gateway on a vehicle in motion will enter a beacon mode periodically.

The process of FIG. 8 starts at block 810 and proceeds to block 712 in which a check is made to determine whether the beacon mode needs to be entered. If not, the process continues to loop on block 812 until the beacon mode needs to be entered. As with check 712 on the sensor module, the check at block 812 could be based on a low power clock which will wake-up the radio core and/or processor of the gateway.

From block 812, once it is time to enter the beacon mode, the process proceeds to block 820 in which the radio and typically the processor of the gateway wakes-up or is woken, for example by an external signal. The process then proceeds to block 822 in which the gateway may send the preamble.

From block 822 the process proceeds to block 830 in which a check is made to determine whether or not a response to the preamble has been received. If not then the process proceeds to block 840 in which a check is made to determine whether the beacon mode has ended.

From block 840, if the beacon mode has not ended and no preamble has been received at block 830. the process proceeds back to block 822 in which the preamble is resent then the process continues.

If a preamble is received, then the process proceeds from block 830 to block 850 in which communication exchange occurs. For example, such communication exchange may include the stored sensor data from the sensor module. It may further include clock information from the gateway.

Once communication has ended and the beacon mode is over, the process proceeds to block 852 in which the processor and radio are powered down. Powering downs could mean that the gateway uses little or no power. For example, the gateway could have all functionality turned completely off, with the exception of a clock to trigger wake-up. Alternatively, powering down could mean entering a low power mode.

From block 840, if the beacon mode has ended before a response to the preamble has been received, the process proceeds to block 852 and the processor and radio are powered down.

The process then proceeds from block 852 to block 812 to wait for the next beacon period.

When the sensor system enters into a different mode of operation, different timing profiles may be used. For example, if the mode of operation is based on motion of the vehicle (motion mode), the sensor system may move into the "stationary" profile when a detection is made that the vehicle is still. This detection may, for example, be based on a position location system within the gateway and/or the sensor module. It may also be based on signaling between the gateway and sensor modules. Thus if the gateway includes a positioning system, it may detect that the vehicle is stationary and signal this to the sensor modules. Other modes of operation may include time of day options, or whether it is light or dark, fine weather or not; or how the state of the batteries is within the separate components, among other options.

The sensor modules may further use their sensors to detect when the vehicle is stationary. For example, a vibration sensor on a bearing may detect no vibration for a threshold time period, which may signal to the sensor module that the vehicle is stationary.

Other options for detecting the mode change are possible.

Figure 9:
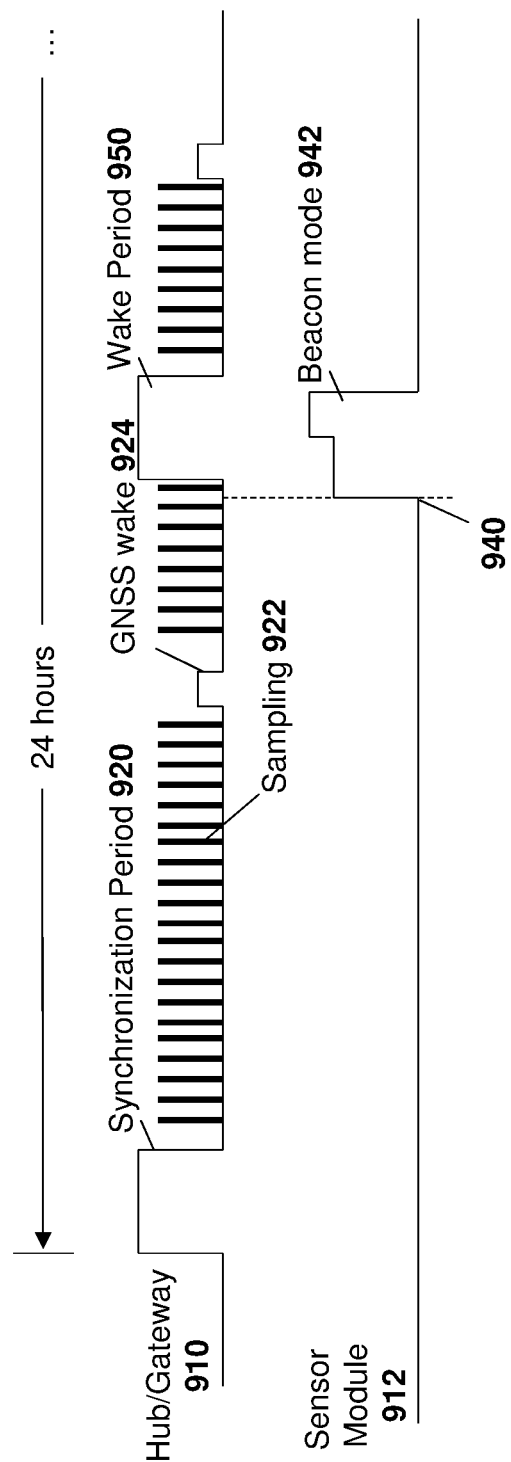
FIG. 9 is a timing diagram showing a second embodiment in which a gateway oversamples a beacon signal from a sensor module.

References is now made to FIG. 9, which shows an example timing diagram for timing profiles when a vehicle is stationary. When the sensor system is still, the sensor module may be in a low power mode or deep sleep and is only configured to wake-up if a critical event has occurred. For example, if the temperature on a vehicle falls below a certain threshold or rises above a threshold, or if a tire blows on a TPMS monitoring system, then a critical condition may exist and the sensor module may wake-up.

As seen in FIG. 9, the gateway 910 is configured to wake-up periodically, as shown by synchronization period 920. For example, the gateway may wake-up every 24 hours. The sensor module 912 may know such interval and it may also wake-up during this time period for synchronization purposes.

However, the if gateway only turned on every 24 hours the delay in reporting critical sensor events would typically be too long. Therefore, as seen in the embodiment of FIG. 9, after the synchronization period 920, the gateway 910 may periodically sample signals from sensor modules. For example, such sampling may occur every 15 minutes. The sampling is shown, for example, with arrows 922.

The wake-up during the sampling at arrows 930 may be done by the gateway radio core, such as radio controller 132 from FIG. 1. In this case, the processor of the gateway does not need to be woken up in order to save battery life on the gateway.

The gateway may further occasionally perform a position fix, shown by GNSS wake 924. For example, this may be done every three hours in one embodiment.

In accordance with the embodiment of FIG. 9, sensor module 912 detects a critical sensor event at time 940. It may then enter a beacon mode 942 in which a beacon is sent to the gateway 910. In some cases, the beacon may be sent at an expected sampling wake-up time for the gateway.

During sampling, the gateway may be turned on before the scheduled wake-up time. For example, in one embodiment the gateway may turn on the radio core 5 to 10 seconds before the scheduled sampling time. This could be done to account for clock drift in the separate components of the system.

The sensor module, upon wake-up based on a critical sensor event, may keep transmitting the preamble until the gateway responds with a preamble response (or any other transmission to acknowledge the request) or until a defined timeout has occurred.

Upon detecting the preamble, the gateway may wake-up the processor in a wake period 950. Communication may then be exchanged with the sensor module. Gateway 910 may then perform a server update and may then return to the sleep state.

As will be appreciated by those skilled in the art, the wake-up time in the embodiments of FIGS. 6 to 9 will typically take into account the device boot time and may account for clock drift as well.

The process at each of the sensor module 912 and gateway 910 is described below with regards to FIGS. 10 and 11.

Figure 10:
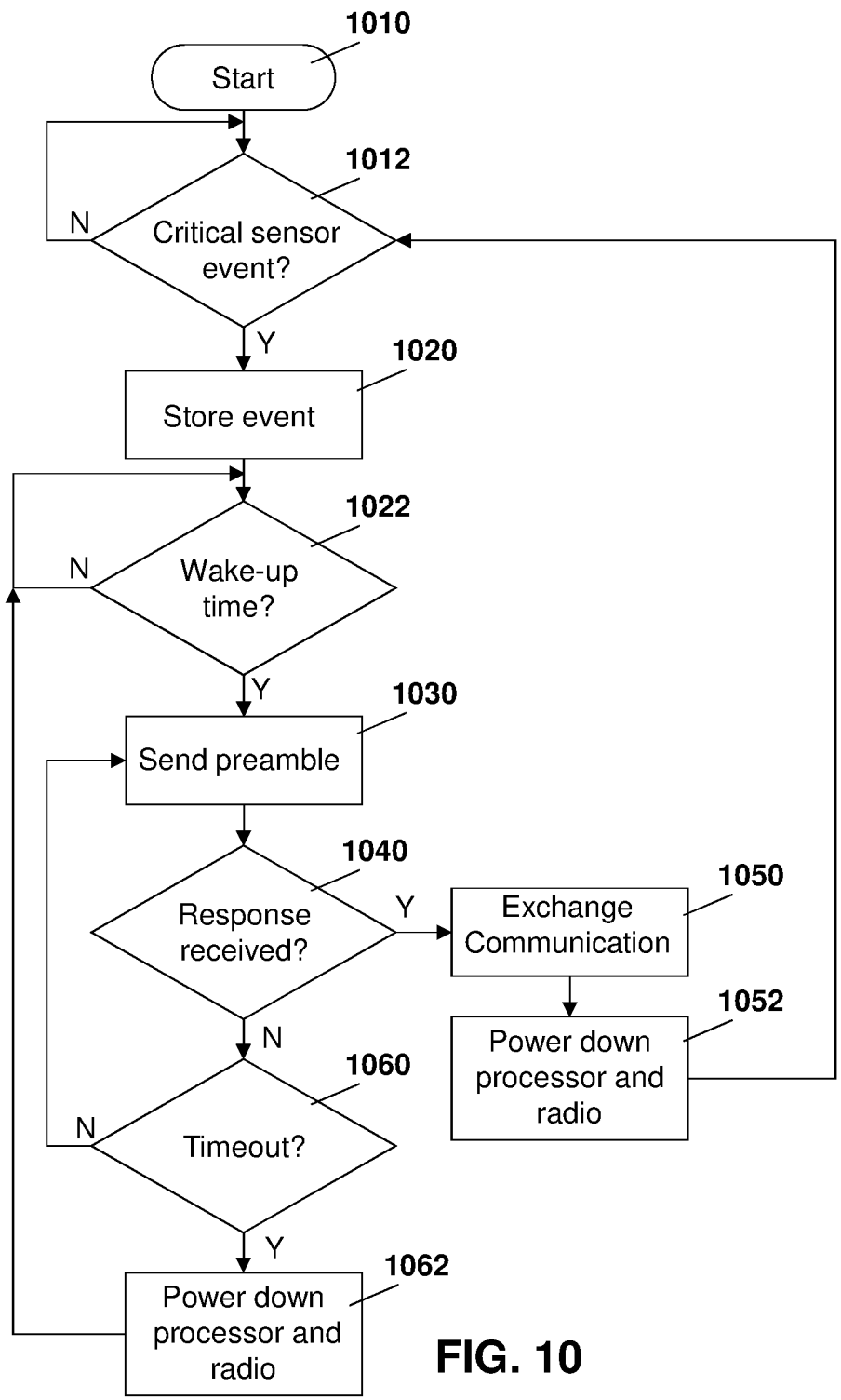
FIG. 10 is a process diagram showing a process at a sensor module for communicating a critical sensor event.

Reference is now made to FIG. 10, which shows a process at sensor module 912. The process of FIG. 10 starts at block 1010 and proceeds to block 1012 in which a check is made to determine whether a critical sensor event has been received. If not, the process continues to loop on block 1012 until a critical sensor event is received.

From block 1012, if a critical sensor event has occurred then the process proceeds to block 1020 in which the event is stored.

The process then proceeds to block 1022 in which a check is made to determine whether it is appropriate time for the gateway to wake-up. If not, the process proceeds to loop on block 1022 until the appropriate time has been reached.

From block 1022, if the appropriate time has been reached the process proceeds to block 1030 in which the sensor module sends a preamble.

The process then proceeds to block 1040 in which a check is made to determine whether a response has been received. If yes, the process proceeds to block 1050 in which communication exchange occurs between the gateway and the sensor module. Such communication exchange may include providing the critical sensor data to the gateway.

The process then to block 1052 in which the processor and radio power down. Again, this could mean that the sensor module uses little or no power. For example, the sensor module could have all functionality turned completely off, with the exception of a clock to trigger wake-up. Alternatively, powering down could mean entering a low power mode.

From block 1052 the process may then proceed back to block 1012 to wait for the next critical event.

Conversely, from block 1040, if the response to the preamble has not been received then the process proceeds to block 1060 in which a check is made to determine whether or not a communication timeout has occurred. If not, the process loops back to block 1030 in which the preamble is re-sent.

From block 1060, if a timeout has occurred then the process proceeds to block 1062, in which the processor and radio are powered down. The process may then proceed back to block 1022 to wait for the next transmission opportunity.

Figure 11:
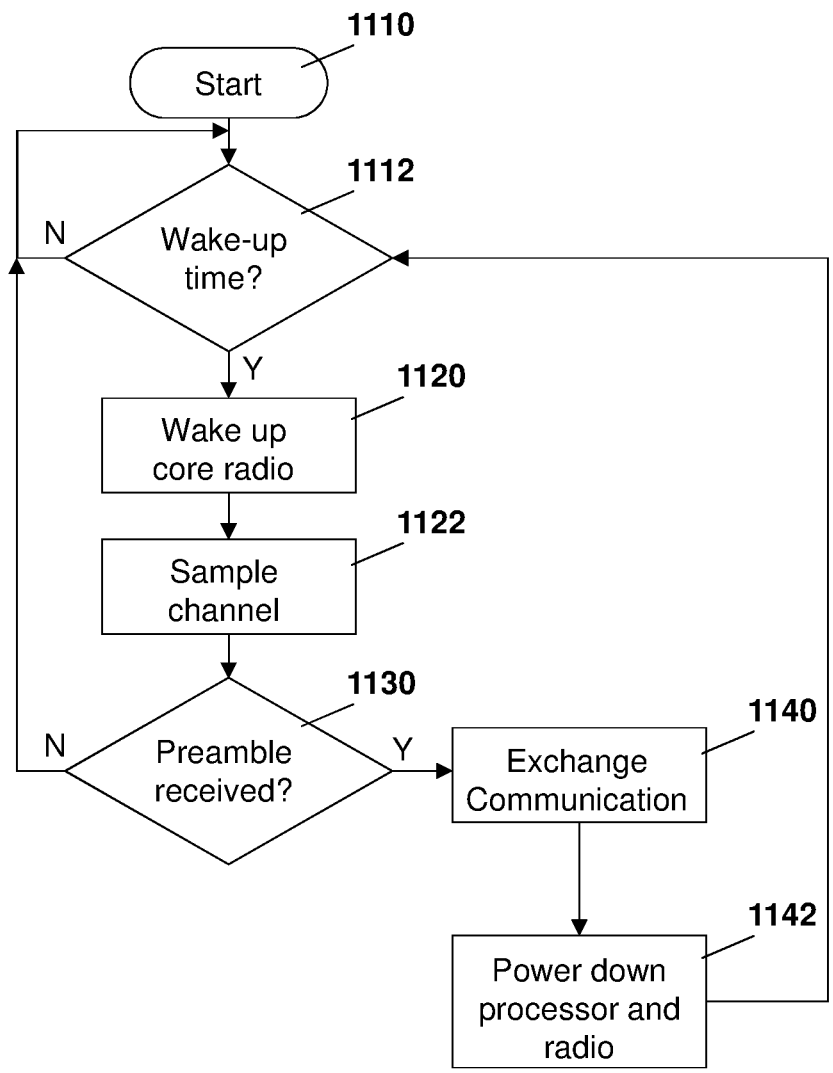
FIG. 11 is a process diagram showing a process at a gateway for receiving a critical sensor event.

Reference is now made to FIG. 11. From the gateway perspective, the process starts at block 1110 of the FIG. 11 and proceeds to block 1112. In block 1112, a check is made to determine whether it is time to wake-up the gateway. As will be appreciated, the wake-up time may occur periodically and the sampling of the channel may occur at a threshold time before the scheduled wake-up time. From block 1112, if the time has not yet been reached to wake-up the radio then the process proceeds back to block 1112 and continues to loop.

From block 1112, once the time has been reached then the process proceeds to block 1120 in which the radio core of the gateway is woken up.

The process then proceeds to block 1122 in which the channel is oversampled for a time duration.

From block 1122 the process proceeds to block 1130 in which a check is made to determine whether a preamble has been received. If not, the process proceeds to block 1112 and continues to wait for the next period to wake-up the radio.

Conversely, if a preamble has been received at block 1130 then the process proceeds to block 1140 in which communication exchange occurs between the gateway and sensor module. Such communication exchange may include receiving the critical sensor data at the gateway. At block 1140, communication may additionally be exchanged with the network servers such as servers 240 or 242 from FIG. 2.

The process then proceeds to block 1142 in which the processor and radio are powered down. Again, this could mean that the gateway uses little or no power. For example, the gateway could have all functionality turned completely off, with the exception of a clock to trigger wake-up. Alternatively, powering down could mean entering a low power mode.

From block 1142, the process then proceeds to block 1112 and continues to monitor the channel.

Thus, based on the above, the behavior of the gateway and/or sensor module may be varied based on the mode of operation of the vehicle. Further, in the operation mode 320, the battery of the gateway and/or sensor module is saved by only waking up periodically and sampling or oversampling the signal using a radio core prior to waking up the processor on the device.

To facilitate the operation of the embodiments above, the sensor module and gateway should typically remain synchronized. This may be done in several ways.

A first way to synchronize the clock on the gateway with the clock on the sensor modules is through messaging. For example, when the vehicle is in a stationary mode, the gateway may wake-up periodically, such as every 24 hours. During such wake-up, communication may be exchanged between the gateway and the sensor module. Such communication may include a clock signal or value from the gateway to the sensor module to allow the sensor module to update its timings.

Such messaging exchange may further occur during any other communication exchange. For example, timing information may be exchanged at block 752 of FIG. 7, block 850 of FIG. 8, block 1050 of FIG. 10, or block 1140 of FIG. 11.

In one embodiment, the timing settings may represent a clock used by a processor of the gateway. This may be an internal clock on the gateway. Further, such internal clock may be synchronized to a positioning system clock or a server clock in some cases.

In other embodiments, a clock on the radio may be synchronized. For example, in the embodiment of FIG. 7, the sensor module wakes up and starts oversampling the signal. It is expecting that the signal will be oversampled for a fixed number of intervals. For example, in the embodiment of FIG. 7, the sensor module may wake-up five seconds prior to the signal being transmitted and may therefore expect that five sampling periods occur prior to the preamble being received. If the preamble is received after three samples then this may indicate a clock drift has occurred and the sensor module may update its timing settings on the radio.

Similarly, if the preamble is received after eight sampling periods then this may also indicate that clock drift has occurred and the sensor module clock may be adjusted the other way in order to keep the clocks synchronized.

Further, the beacon modes 620 from FIG. 6 or 910 from FIG. 9 may occur even if there is no data to be exchanged. This keeps the clocks generally synchronized.

The above therefore provides that time correction is done at multiple levels in the system, including receipt radio transceiver level, the host processor with a Global Navigation Satellite System/Network Time Protocol (GMSS/NTP), among other options. This renders the overall system synchronized while keeping power levels of the minimum.

Data may be exchanged with servers such as server 240 or 242. Such server may be any network node. For example, one simplified server that may perform the embodiments described above is provided with regards to FIG. 12.

Figure 12:
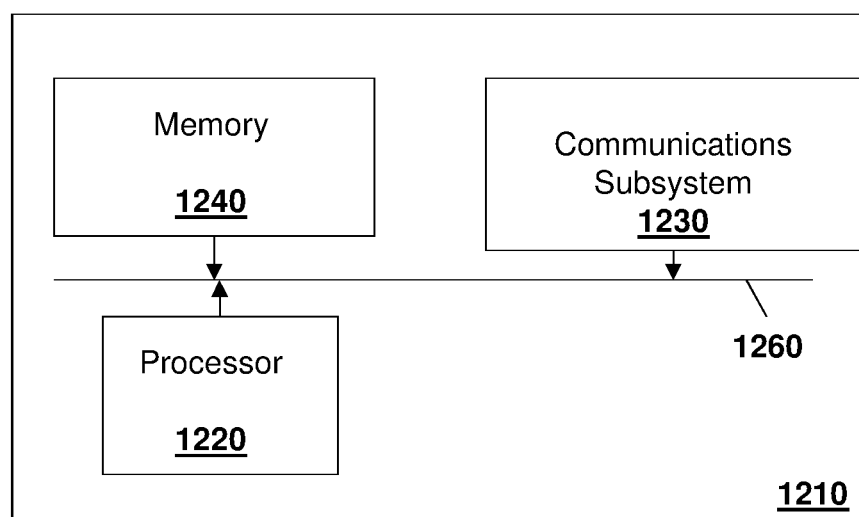
FIG. 12 is a block diagram of an example computing device capable of being used in accordance with the embodiments of the present disclosure.

In FIG. 12, server 1210 includes a processor 1220 and a communications subsystem 1230, where the processor 1220 and communications subsystem 1230 cooperate to perform the methods of the embodiments described herein.

Processor 1220 is configured to execute programmable logic, which may be stored, along with data, on server 1210, and shown in the example of FIG. 12 as memory 1240. Memory 1240 can be any tangible, non-transitory computer readable storage medium, such as optical (e.g., CD, DVD, etc.), magnetic (e.g., tape), flash drive, hard drive, or other memory known in the art.

Alternatively, or in addition to memory 1240, server 1210 may access data or programmable logic from an external storage medium, for example through communications subsystem 1230.

Communications subsystem 1230 allows server 1210 to communicate with other devices or network elements.

Communications between the various elements of server 1210 may be through an internal bus 1260 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a module within a sensor system for updating a timing profile, the method comprising:
turning on a radio of the module for a first time duration, the first time duration being selected to allow detection of signals from a plurality of other modules within the sensor system;
detecting signals from the other modules within the sensor system;
for each signal, storing data comprising a time such signal is received and an identifier for each of the other modules sending such signals;
sending the data to a server; and
receiving the timing profile from the server.

2. The method of claim 1, wherein the module is one of a gateway and a sensor module.

3. The method of claim 1, wherein the timing profile includes reconfiguration parameters for a subset of modules within the sensor system to reconfigure reporting periods for the subset of modules.

4. The method of claim 1, wherein the timing profile includes awake periods and sleep periods for the module within the sensor system.

5. The method of claim 1, further comprising:
turning on the radio of the module for a second time duration;
detecting signals from at least one other module within the sensor system;
for each signal, storing data comprising a time such signal is received and the identifier for the at least one other module sending such signal;
sending the data to the server; and
receiving an updated timing profile from the server.

6. The method of claim 5, wherein the turning on the radio for the second time duration is performed periodically.

7. The method of claim 5, wherein the turning on the radio for the second time duration is performed based on a command from the server.

8. The method of claim 5, wherein the turning on the radio for the second time duration is performed based on interaction with a user interface at the sensor system.

9. The method of claim 1, wherein the timing profile minimizes battery, consumption of the sensor system.

10. A module within a sensor system, the module comprising:
a processor; and
a communications subsystem having a radio,
wherein the module is configured to:
turn on the radio of the module for a first time duration, the first time duration being selected to allow detection of signals from a plurality of other modules within the sensor system;
detect signals from the other modules within the sensor system;
for each signal, store data comprising a time such signal is received and an identifier for each of the other module sending such signals;
send the data to a server; and
receive a timing profile from the server.

11. The module of claim 10, wherein the module is one of a gateway and a sensor module.

12. The module of claim 10, wherein the timing profile includes reconfiguration parameters for a subset of modules within the sensor system to reconfigure reporting periods for the subset of modules.

13. The module of claim 10, wherein the timing profile includes awake periods and sleep periods for the module within the sensor system.

14. The module of claim 10, wherein the module is further configured to:
turn on the radio of the module for a second time duration;
detect signals from at least one other module within the sensor system;
for each signal, store data comprising a time such signal is received and the identifier for the at least one other module sending such signal;
send the data to the server; and
receive an updated timing profile from the server.

15. The module of claim 5, wherein the module is configured to turn on the radio for the second time duration periodically.

16. The module of claim 5, wherein the module is configured to turn on the radio for the second time duration based on a command from the server.

17. The module of claim 5, wherein the module is configured to turn on the radio for the second time duration based on interaction with a user interface at the sensor system.

18. The module of claim 1, wherein the timing profile minimizes battery consumption of the sensor system.

19. A non-transitory computer readable medium for storing instruction code, which, when executed by a processor of a module within a sensor system, cause the module to:
turn on the radio of the module for a first time duration, the first time duration being selected to allow detection of signals from a plurality of other modules within the sensor system;
detect signals from the other modules within the sensor system;
for each signal, store data comprising a time such signal is received and an identifier for each of the other modules sending such signals;
send the data to a server; and
receive a timing profile from the server.

* * * * *